(12) United States Patent
Creigh

(10) Patent No.: US 7,257,374 B1
(45) Date of Patent: Aug. 14, 2007

(54) AUTOMATIC SECURITY LOCKING METHOD AND SYSTEM FOR WIRELESS-ENABLED DEVICES

(75) Inventor: George Samuel Creigh, Acworth, GA (US)

(73) Assignee: Cingular Wireless II, LLC, Atlanta, GA (US)

( * ) Notice: Subject to any disclaimer, the term of this patent is extended or adjusted under 35 U.S.C. 154(b) by 354 days.

(21) Appl. No.: 11/008,759

(22) Filed: Dec. 10, 2004

(51) Int. Cl.
*H04B 7/00* (2006.01)
*H04M 1/66* (2006.01)

(52) U.S. Cl. ..................... 455/41.2; 455/411

(58) Field of Classification Search .............. 370/310; 455/456.4, 410, 425, 41.1–41.3
See application file for complete search history.

(56) References Cited

U.S. PATENT DOCUMENTS

| | | | |
|---|---|---|---|
| 5,557,259 A | 9/1996 | Musa | |
| 5,635,897 A | 6/1997 | Kuo | |
| 5,832,296 A | 11/1998 | Wang et al. | |
| 5,850,180 A | 12/1998 | Hess | |
| 6,108,197 A | 8/2000 | Janik | |
| 6,236,307 B1 | 5/2001 | Kurano | |
| 6,304,168 B1 | 10/2001 | Ohta et al. | |
| 6,487,180 B1 * | 11/2002 | Borgstahl et al. ........... | 370/310 |
| 6,553,223 B1 | 4/2003 | Bayley et al. | |
| 6,594,370 B1 | 7/2003 | Anderson | |
| 6,603,981 B1 | 8/2003 | Carillo, Jr. et al. | |
| 6,711,414 B1 | 3/2004 | Lightman et al. | |
| 6,757,719 B1 | 6/2004 | Lightman et al. | |
| 6,760,772 B2 | 7/2004 | Zou et al. | |
| 6,987,948 B2 * | 1/2006 | Engstrom et al. .......... | 455/41.1 |
| 2001/0044318 A1 | 11/2001 | Mantyjarvi et al. | |
| 2002/0194500 A1 | 12/2002 | Bajikar | |
| 2003/0074575 A1 | 4/2003 | Hoberock et al. | |
| 2003/0164750 A1 | 9/2003 | Kim | |
| 2003/0184431 A1 | 10/2003 | Lundkvist | |
| 2004/0066918 A1 | 4/2004 | Sifuentes | |
| 2004/0145471 A1 * | 7/2004 | Lawrenson et al. .... | 340/539.21 |
| 2004/0178907 A1 | 9/2004 | Cordoba | |
| 2004/0215816 A1 | 10/2004 | Hayes et al. | |
| 2005/0090267 A1 * | 4/2005 | Kotzin ................... | 455/456.4 |
| 2006/0046745 A1 * | 3/2006 | Davidson ................ | 455/456.4 |

* cited by examiner

*Primary Examiner*—Philip J. Sobutka
(74) *Attorney, Agent, or Firm*—Gardner Groff Greenwald & Villanueva, P.C.

(57) ABSTRACT

A security system for wireless devices such as mobile phones includes a wireless signal transmitter, and a signal strength detector and microprocessor associated with the wireless device being safeguarded. The microprocessor disables or locks the wireless device if the measurement by the detector of the strength of the signal transmitted by the wireless transmitter is less than a predetermined value, thereby indicating that there is more than a predetermined separation distance between the protected device and the transmitter, i.e., that, e.g., someone has taken the device. The disabled wireless device stays disabled until the measured signal strength is again greater than the predetermined value. Once this value is reached the device is automatically unlocked or enabled.

23 Claims, 2 Drawing Sheets

AUTOMATIC SECURITY LOCKING METHOD AND SYSTEM FOR WIRELESS-ENABLED DEVICES

FIELD OF THE INVENTION

The present invention generally relates to wireless terminal devices such as wireless handsets and more particularly, to security systems and methods for automatically disabling or locking such devices.

BACKGROUND OF THE INVENTION

Wireless devices such as laptop computers, palm-sized computing devices, two-way pagers, cellular phones and personal digital assistant (PDA) devices have become increasingly popular. Some of these devices enable the user to communicate with others vocally and through electronic mail and instant messaging, as well as to collect, analyze and distribute important information as the user travels. An important trend involves making the devices as small and compact as possible. While these advantages have been warmly embraced by the public, one disadvantage of the compactness, usefulness, easy accessibility and ubiquity of these devices is that the devices have now become increasingly vulnerable to theft or other unauthorized use.

Many computers, especially portable computers have been secured from unauthorized use through different preventive techniques. One previous method of preventing unauthorized use is an automatic logging off system. This system automatically logs off the computer if the computer device has been inactive for a specified period of time much like a computer screensaver. If an authorized user has logged onto a secure computer, but not entered any input for a predetermined period of time, the concern is that the authorized user might have discontinued use and left the computer unattended without securing the computer. Under these circumstances, if an unauthorized user can get to the computer during this time while the computer is still logged on, the unauthorized person will have full access to the information and resources on the computer. The likelihood of this occurring can be diminished by having the computer automatically log off if the computer goes unused for a specified period of time. With this approach, in order to obtain access again, the authorized user must log back onto the system by entering his or her password.

While the automatic timed lock approach is useful because it protects information and resources, it may also be an inconvenience to authorized users. In this regard, the authorized user is inconvenienced, and productivity is impaired, when the user has to log back in to the computer each time he or she has to leave the computer for a short period of time. Logging back on can become an annoyance if the process needs to be repeated in a nearly continuous manner in situations where the user is frequently away from the computer. A longer period of time for automatic log off can be provided but this undermines the effectiveness of the whole auto log off approach Another preventative measure taken to secure information on computers is the use of a magnetic swipe card to unlock a computer once the computer has timed out. The computer time out mechanism works the same as the method described above, i.e., log off is automatic if the computer is not used for a specified period of time but instead of entering a password to regain access, a card is swiped through a reader which is associated with the computer. For example, such a reader may be attached to the computer by a daisy chain. This swiping of the card unlocks the computer.

Although the use of such a swipe card allows the user to unlock the computer without having to enter a password, the repetitive action of having to swipe the card through the reader each time the computer locks as a result of the user stepping away from his desk can still become annoying. Further, with the new generation of compact, mobile computer devices, the card reader itself may also be larger than the device being protected, thus defeating the convenience of having a mobile device. Also, the card may be left at the desk unintentionally, as swipe cards often are, thereby defeating the security provided by use of such a card.

A further type of security system that is of particular interest here is wireless locking systems that use a wireless signaling device to cause locking of another wireless-enabled device. For example, such systems are used to remotely control door locks for automotive vehicles, and in a number of other applications.

Patent publications of interest here include U.S. Patent Application Publication No. 2004/0178907A1 which relates to an alarm system for preventing loss or theft of a portable and/or movable device such as a mobile telephone. The system determines the distance between the telephone and another movable and/or portable device using the Global Positioning System (GPS) and an alarm is generated when that distance exceeds a predetermined distance. At least one of the devices may be locked when the alarm is triggered. Other patent publications of background interest include Publication Nos. U.S. 2004/0215816A1 and U.S. 2003/0184431A1.

U.S. Pat. No. 5,635,857 discloses a mobile phone alarm system including a phone device attached to the mobile phone and body device adapted to be carried by a user. The phone device repeatedly transmits a verification signal of limited power to the body device. The signal is only identifiable within a predetermined limited distance and if the separation distance between the devices exceeds this predetermined distance, the body device receives no signal and alarms.

SUMMARY OF THE INVENTION

In accordance with one aspect thereof, the present invention provides improved protection against theft, and other unauthorized use, for portable wireless-enabled devices, such as cellular telephones, which are capable of receiving short range wireless signals.

In accordance with one embodiment of the invention, there is provided a method for selectively disabling a wireless-enabled device, the method comprising:

generating a short range wireless signal using one of (i) the wireless-enabled device and (ii) a further device separate from the wireless-enabled device;

measuring, using the other of the further device and the wireless-enabled device, a parameter associated with the short range signal which is related to the separation distance between the wireless-enabled device and the further device; and automatically disabling at least one function of the wireless-enabled device when the measured parameter is of value outside of a predetermined value and thus the separation distance is outside of a preselected threshold.

Preferably, the parameter measured comprises signal strength and the at least one function is disabled when the measured signal strength is less than a predetermined value.

The disabling of the at least one function preferably comprises locking the wireless-enabled device so as to prevent use thereof.

In one important implementation, the wireless-enabled device comprises a wireless handset and disabling of the at least one function comprises locking the handset against making outgoing calls. In one embodiment of this aspect of the invention, the disabling of at least one function further comprises locking of the handset against receiving incoming calls.

In accordance with another important feature, the method further comprises providing a bypass option for bypassing the at least one function such that, when said bypass option is exercised, a bypass is executed wherein the at least one function is not disabled even though said measured parameter is of a value outside of said predetermined value. Preferably, before the bypass option can be exercised, a password must be provided. Advantageously, the bypass, when executed, is turned off after a predetermined time period so that, after the time period has run out, the at least one function can again be disabled depending on the value of the measured parameter.

Preferably, the measured parameter is measured periodically.

In another preferred implementation, the parameter is signal strength, and one of a plurality of different signal strengths can be selected by the user based on selection of one of a plurality of corresponding separation distances between the wireless-enabled device and the further device.

Preferably, after the at least one function is disabled, said parameter is again measured, and said disabling of the at least one function is terminated when the measured parameter is of a value within said predetermined value.

In accordance with another embodiment of the invention, a security system for a portable wireless-enabled device, said system including:

a portable transmitter, adapted to be carried or worn on the person of a user of the system, for generating a short range wireless signal; and the portable wireless-enabled device including means for measuring the signal strength of said signal so as to provide an indication of the separation distance between the transmitter and the device, and means for disabling at least one function of the wireless-enabled device when the measured signal strength is less than a predetermined value, thereby indicating that the separation distance is more than a predetermined threshold distance.

Advantageously, the transmitter is contained in a device comprising one of a set of earphones, a writing instrument, eyeglasses and a wristwatch.

In an important implementation, the portable wireless-enabled device comprises a wireless handset and the means for disabling the at least one function comprises means for locking the handset against making outgoing calls. Advantageously, the means for disabling at least one function comprises means for also locking of the handset against receiving incoming calls.

Preferably, the wireless-enabled device includes a processor for providing a bypass option for bypassing the automatic disabling of the at least one function such that, when the bypass option is exercised, a bypass is executed wherein the at least one function is not disabled even though the measured signal strength is of a value less than the predetermined value. Advantageously, before the bypass option can be exercised, the processor requires that a password be provided. Preferably, the processor, when the bypass is executed, turns off the bypass after a predetermined time period so that the at least one function can again be disabled depending on the measured signal strength.

Advantageously, the wireless-enabled device measures the signal strength of the signal periodically.

Preferably, the wireless-enabled device provides for selection of one of a plurality of different signal strengths by the user based on selection of one of a plurality of corresponding separation distances between the wireless-enabled device and the transmitter.

Preferably, after the at least one function is disabled, the wireless-enabled device again measures signal strength and the disabling of the at least one function is terminated when the measured signal strength is greater than said predetermined value.

In accordance with yet another embodiment of the invention, there is provided a method for selectively locking a Bluetooth-enabled wireless handset, the method comprising:

generating a Bluetooth signal using a transmitter separate from the handset;

monitoring the signal using the wireless handset so as to determine when the signal is of a strength less than a selected level and thus that the handset is more than a predetermined separation distance from the transmitter; and automatically locking the wireless handset so as to prevent at least outgoing calls from being made therefrom when a determination is made that the strength of the monitoring signal is less than the selected level.

In one implementation, the transmitter is contained in a device that is wearable on the person of a user or in a device capable of being carried on the person of a user.

Advantageously, the transmitter is contained in a device comprising one of a set of earphones, a writing instrument, eyeglasses and a wristwatch.

In one advantageous implementation, locking of the handset prevents both incoming and outgoing calls.

In accordance with an important feature of this aspect of the invention, the method further comprises providing a bypass option for bypassing the automatic locking of the handset such that, when the bypass option is exercised, a bypass is executed wherein locking of the handset does not take place even though the measured signal strength is less than the selected value. Preferably, before the bypass option is exercised, a password is required. Advantageously, the bypass, when executed, is turned off after a predetermined time period so that the locking of the handset can again occur depending on the value of the measured signal strength.

Preferably, one of a plurality of different signal strengths can be selected by the user based on selection of one of a plurality of corresponding separation distances between the wireless handset and the transmitter.

Preferably, after the locking occurs, signal strength is again measured, and the locking is terminated when the measured signal strength is more than the selected value.

Further features and advantages of the present invention will be set forth in, or apparent from, the detailed description of preferred embodiments thereof which follows.

DETAILED DESCRIPTION OF THE PRESENT EMBODIMENT

Generally speaking, the method and system described are directed to a wireless security system. As required, specific embodiments of the present invention are disclosed below. It is to be understood that the disclosed embodiments are merely exemplary of the invention and that the invention may be embodied in various other alternative forms.

Figure 1:
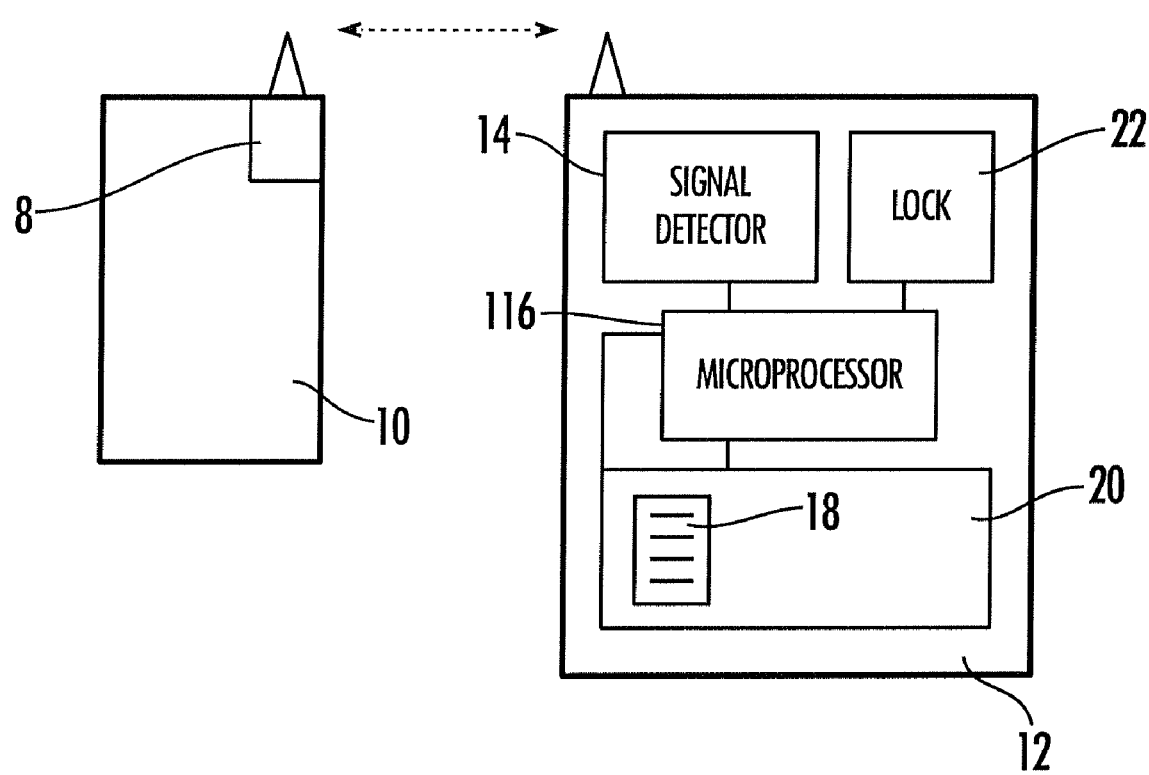
FIG. 1 is a schematic block diagram of one preferred embodiment of the basic components of the security system of the invention.

Referring to FIG. 1, the exemplary embodiments discussed below are directed to sending a signal from a transmission device 10 containing a wireless transmitter 8 to a wireless-enabled device 12 including a signal detector (or receiver) 14 including a microprocessor 16 that controls various functions including automatically disabling the device 12 when the signal detector 14 and thus the device 12, are separated from the transmitter 8 of device 10 more than a predetermined distance. It is important to note that, in an alternative embodiment, the signal detector may be located in a receiver device corresponding to device 10 and the transmitter 8 may be located in a wireless-enabled device corresponding to device 12.

The abovementioned separation may occur when, for example, the wireless-enabled device 12 is stolen or is otherwise transported away by an unauthorized person. Such separation may also occur, for example, when the authorized user (having transmitter 8) walks away from her laptop (having a signal detector 14) that is secured to a fixed location, such as where the authorized user walks away from a laptop locked to his or her desk at work (or in a library) to go to the restroom. In this situation, the authorized user may have the transmitter 8 attached to his or her person and the receiver or signal detector 14 may be located in the laptop. In this implementation, a processor in the laptop (corresponding to processor 16 of FIG. 1) causes locking up of the laptop to prevent use when the user carrying transmitter 8 has traveled a predetermined distance from the detector 14 when, for the example above, going to the restroom. When the authorized user returns to a location within the predetermined distance, the signal detector 14 receives a signal that causes the processor in the laptop to automatically unlock the laptop for use. As discussed below, in a preferred embodiment, this separation distance or separation range is determined by measuring the strength of the transmitted signal using the wireless-enabled device 12.

As indicated above, in the exemplary embodiment illustrated in FIG. 1, the transmitter 8 is located in transmission device 10 and the signal detector 14 is located in the wireless-enabled device 12 that is to be protected against unauthorized use. In a specific preferred embodiment, the protected wireless-enabled device 12 may be a wireless handset, a mobile phone, a PDA, a facsimile, a copier, and the like. The wireless-enabled device 12 includes the signal detector 14 that measures the strength of a signal transmitted from the wireless transmitter 8 so as to determine whether a security lock on the wireless-enabled device 12 should be enabled or the wireless-enabled device 12 should be otherwise disabled. If the signal detector 14 in the wireless-enabled device 12 receives a signal from the transmission device 10 that is below a predetermined signal strength, the wireless-enabled device 12 will begin its locking process.

The transmitted signal communicated between the transmitter device 8 and the signal detector 12 can take a number of forms. In a preferred embodiment, the transmitted signal is a short range wireless signal such as a Wi-Fi or, preferably, a Bluetooth signal. However, in other embodiments, the transmitted signal could be of a different wavelength such as an infrared signal. A Bluetooth signal is generally preferred because its range is consistent with the separation distances contemplated. In this regard, as discussed below, the typical maximum operating range for a Bluetooth operation is about thirty feet although it may be as much as fifty feet or more or twenty feet or less, depending on the operating environment. Bluetooth communications and data transfer are familiar to those skilled in the art, particularly in view of standards and profile specifications promulgated by the Bluetooth SIG and other industry entities. The Bluetooth communication between the signal detector 14 and the transmitter 8 may be of any now known, or later developed, power rating class associated with various Bluetooth transmission ranges.

According to the systems and methods of this invention, no physical connection is required between the transmitter device 10 and the wireless-enabled device 12. In one exemplary embodiment using Bluetooth transmission, a one-time Bluetooth "pairing" process is performed prior to communication between the transmitter 8 and the signal detector 14 in the wireless-enabled device 12 so that the devices 8 and 14 can be authorized to communicate with each other via a "paired link" during a Bluetooth communication session. Furthermore, the transmitter 8 in the transmission device 10 may transmit signals for enablement of various devices, including wireless devices, stand-alone devices, hardwired devices, and the like. It is an aspect of the invention that such a device or devices are to be wirelessly enabled and disabled with respect to various functions thereof as a result of the communication between the signal detector 14 and the transmitter 8.

In one embodiment, the signal detector 14 in the wireless-enabled device 12 and the transmitter 8 in the transmission device 10 may be configured to operate via Bluetooth wireless technology within a personal-area-network, or piconet. The piconet is composed of a master and from at least one to numerous active slave devices. Once the piconet is established, a virtual connection is made and the participating devices randomly hop frequencies in unison so that they stay in touch with one another and avoid other piconets that may be operating in the same room, such as a piconet formed between a television and its remote control. The device designated as the master makes the determination of the channel (frequency-hopping sequence) and phase (timing offset, i.e., when to transmit) that shall be used by all devices on the piconet. In accordance with systems and methods of this invention, the master and slave relationship may be implemented, and/or exchanged, between the wireless-enabled device 12 and the transmission device 10 carried by the authorized user.

In implementing this configuration of the invention in connection with the exemplary embodiment in FIG. 1, the transmission device 10 (including the transmitter 8) operates as the master, and the wireless-enabled device 12 (including the signal detector 14) is implemented as the slave. In accordance with standard Bluetooth link control manager protocol, the transmitter 8 broadcasts a beacon signal in order to detect the presence of the wireless-enabled device 12. In a "sniff" mode, the signal detector 14 in the wireless-enabled device 12 detects the broadcast beacon signal and verifies whether the beacon broadcasted signal is valid. That is, the signal detector 14 determines whether an address associated with the broadcast beacon signal transmitted from the transmission device 10 matches, or is paired with, an address associated with the transmission device 10. When the address from each of the devices is authenticated (i.e., a paired link connection is formed) attachment between the two devices occurs and communication may freely take place. The broadcast and sniffing operation between the transmitter 8 and the signal detector 14 may be continuously or intermittently performed.

Transmission device 10 can also be incorporated in, or form part of, a number of different devices. For example, the transmission device 10 and, in particular the transmitter 8, may be incorporated in a pair of headphones, a writing instrument such as a pen, a wristwatch, sunglasses, an item of apparel, an item that would be suspended from a keychain, or the like. In general, anything that can be carried on the person, or worn, would be a potential candidate.

Considering the wireless-enabled device 12 in more detail, and focusing on an implementation wherein wireless-enabled device 12 is a mobile phone, most mobile phones have a lock function that the user can enable. For example, some mobile phones allow the user to lock the keypad upon the entering of a lock code. In a preferred embodiment, wherein the wireless-enabled device 12 is a mobile phone, the phone includes a signal detector corresponding to detector 14 that enables varying signal strengths to be measured. Such a feature is standard for mobile phones but a conventional mobile phone may have to be modified to measure the signal strengths of, e.g., Bluetooth signals.

The control device or microprocessor 16 of device 12 allows the user, by way of a menu 18 on a display screen 20 on the wireless-enabled device 12, to set a separation distance range and/or a signal strength level corresponding to the desired separation range. The separation distance or range and/or a signal strength level may be selected by the user and/or by the microprocessor 16 in response to various conditions, including presence and location information. Preferably, the presentation provided by menu 18 would be in terms of different separation distances. For example, if the wireless-enabled device 12 is to be locked when the separation distance between transmitter 8 and the signal detector 14 is greater than thirty feet (which, as indicated above, is the transmission range of some Bluetooth transmitters) setting the range at thirty fee will set the signal strength threshold accordingly.

The control device or microprocessor 16 also controls operation of a locking function or security lock 22 and, in particular, causes the wireless-enabled device 12 (e.g., a handset or phone) to lock in response to the detection of a signal strength level below the preset threshold and/or if the separation distance or range is above a predetermined value. The lock function can be set to full or partial status. Setting the lock 22 to full status results in the wireless-enabled device (phone) 12 not being able to receive incoming calls, as well as prevents a user from making outgoing phone calls with the wireless-enabled device (phone) 12. On the other hand, by setting the lock parameter to partial, only the outgoing call function is disabled.

In one preferred embodiment, the range parameter, i.e., the separation distance between devices 10 and 14, can be set to low, medium or high. These settings determine how close the transmitter 8 has to be relative to the signal detector 14 to disable or enable the security lock 22. It will be appreciated that a high range setting allows the user of the wireless-enabled device 12, when carrying the transmitting device 10, more freedom to venture away from the phone 12, i.e., permits a greater separation distance between transmitter 10 and wireless-enabled device 12, without the security lock 22 of the wireless-enabled device 12 being activated. On the other hand, a low setting more severely limits this separation.

Figure 2:
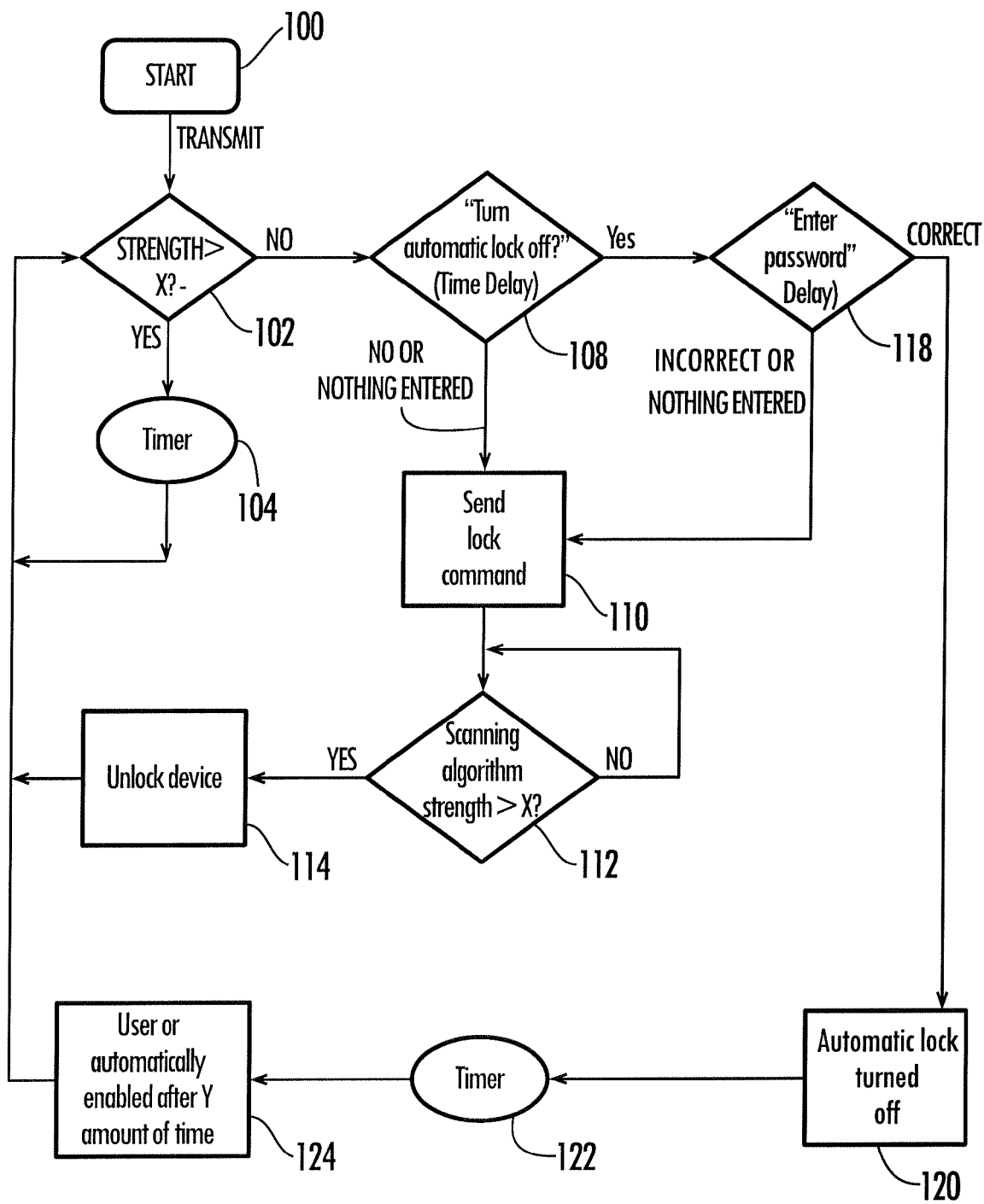
FIG. 2 is a flow chart of one preferred embodiment of the method of the invention.

Referring now to FIG. 2, there is shown a flow chart of one preferred embodiment of the method of the present invention. Once the lock and range parameters have been set as described above, the mobile phone begins receiving the transmitted signal, as indicated by START block 100. Upon the receiving of the signal, a determination is made as to whether the signal strength of the received signal is greater than a predetermined value X, as illustrated by decision diamond 102, wherein the value X is determined by the range setting. As indicated above, for Bluetooth operations, X may typically be between about 20 feet and 50 feet.

If the signal strength is greater than X, i.e., the decision is "Yes," a timer is activated as shown by block 104, so as to provide a delay before initiating receiving and measuring of the transmitted signal again.

If the signal strength is, however, below X, then a screen prompt for the user will appear on the screen of the mobile phone asking if the automatic locking feature should be disabled, as illustrated by decision diamond 108. This feature is optional and is provided so as to permit the authorized user to prevent automatic locking if circumstances dictate this, i.e., where a co-worker or friend is given the phone to use or to show someone else in a different part of the building. The disadvantage of this feature is that a sophisticated thief may use this feature to disable the locking function, without the further safeguard discussed below in connection with decision diamond 118.

If the user fails to choose to disable the automatic locking function, i.e., the decision is "No," or if an appropriate response is not entered within a set period of time, then the lock command, whether partial or full, is sent and the mobile phone enters a lock mode, as shown by block 110.

After the phone enters the lock mode, a scanning algorithm is continuously performed, which monitors the strength of the transmitted signal, shown in block 112. This action is used to determine whether the separation distance between the signal detector 14 in the wireless-enabled device 12 and the transmitting device carried by the authorized user is still greater than the desired threshold. In other words, if the strength of the signal is determined to be less than X, i.e., the decision is "No," this means that the phone is still too far out of range. Under these circumstances, the scanning operation continues in search of an acceptable signal strength. On the other hand, once the signal strength is determined to be greater than X, i.e., the decision is "Yes," the phone unlocks, as illustrated by block 114. The purpose of this feature is to provide automatic unlocking when, e.g., the signal detector 14 in the wireless-enabled device 12 is returned by an authorized user or is otherwise brought into range of the transmission device 10.

At this point, the initial measuring strength of the transmitted signal then begins all over again, as shown by the arrow leaving block 114 and entering decision diamond 102.

Returning to decision diamond 108, if the user decides to turn the automatic lock off, i.e., the decision is "Yes," a screen prompt then appears asking the user to enter his or her password, as shown in decision diamond 118. If the incorrect password or no password is entered by the user, the lock command is then sent, as illustrated through block 110. This feature is a safety measure, or safeguard, in a case where an unauthorized user is in possession of the phone. Once the phone is locked, the scanning algorithm discussed earlier is initiated, as shown in block 112. As discussed above, the phone would then continuously scan, and measure the transmitted signal strength until a signal of the minimum strength is detected which would then cause the phone to unlock, as shown in block 114. Again, the entire process would then start all over again, as shown by the arrow leaving block 114 and entering block 102.

Referring again to block 118, if the password entered by the user is correct, the automatic lock would is then disabled, as shown by block 120. This disabling of the automatic lock is preferably limited to a preset period of time, as indicated by timer 122. After the preset time elapses, the lock will be enabled either by the user, or automatically, as shown by block 124. Measuring of the strength of the transmitted signal then begins again, as illustrated by the arrow leaving block 124 and entering decision diamond 102.

It is noted that, in embodiments wherein a password is needed to disable the automatic lock, the password can be entered automatically, during a predetermined period or periods of the day, when, for example, the user expects to be frequently in and out of his or her office without taking the protected wireless-enabled device 12 or otherwise frequently separated from the wireless-enabled device 12.

Again, although the invention has been described above in relation to preferred embodiments thereof, it will be understood by those skilled in the art that variations and modifications can be effected in these preferred embodiments without departing from the scope and spirit of the invention.

What is claimed is:

1. A method for selectively disabling a wireless-enabled device, said method comprising:
   transmitting a short range wireless signal using one of (i) said wireless-enabled device and (ii) a second device separate from the wireless-enabled device;
   receiving a predetermined threshold value from the user of the wireless-enabled device;
   measuring, using the other of the second device and the wireless-enabled device, signal strength of the signal;
   automatically disabling at least one function of the wireless-enabled device when the signal strength is less than the predetermined threshold value; and
   automatically reenabling the at least one function of the wireless-enabled device when the signal strength is equal to or greater than the predetermined threshold value.

2. A method according to claim 1 wherein said disabling of the at least one function comprises locking the wireless-enabled device so as to prevent use thereof.

3. A method according to claim 1 wherein the signal strength is measured periodically.

4. A method according to claim 1 wherein the wireless-enabled device comprises a wireless handset and disabling of the at least one function comprises locking the handset against making outgoing calls.

5. A method according to claim 4 wherein said disabling of at least one function further comprises locking the handset against receiving incoming calls.

6. A method according to claim 1 wherein the method further comprises providing a bypass option for bypassing the disabling step.

7. A method according to claim 6 wherein a password is received by the wireless-enabled device prior to executing the bypass option.

8. A method according to claim 6 further comprising deactivating the bypass option after a predetermined time period.

9. A security system, comprising:
   a portable transmitter, adapted to be carried or worn on the person of a user of the system, for transmitting a short range wireless signal; and
   a portable wireless-enabled device including a user interface for receiving a threshold value from the user, wherein the portable wireless-enable device measures the signal strength of the short range wireless signal, and disables at least one function of the wireless-enabled device when the measured signal strength is less than the predetermined threshold value.

10. A system according to claim 9 wherein said transmitter is contained in a device comprising one of a set of earphones, a writing instrument, eyeglasses and a wristwatch.

11. A system according to claim 9 wherein said wireless-enabled device measures the signal strength of said signal periodically.

12. A system according to claim 9 wherein the portable wireless-enabled device comprises a wireless handset and wherein the at least one disabled function includes the function for making outgoing calls.

13. A system according to claim 12 wherein the at least one disabled function includes the function for receiving incoming calls.

14. A system according to claim 9 wherein the wireless-enabled device is operable to bypass the automatic disabling of the at least one function.

15. A system according to claim 14 wherein the bypass option is executed upon receipt of a valid password.

16. A system according to claim 14 wherein the bypass option is deactivated after a predetermined time period.

17. A method for selectively locking a Bluetooth-enabled wireless handset, said method comprising:
   transmitting a Bluetooth signal using a transmitter separate from the handset;
   receiving a user-designated threshold value representing a maximum distance that the transmitter can be separated from the Bluetooth-enabled wireless handset;
   monitoring said signal using the wireless handset;
   automatically locking the wireless handset to prevent use of the handset when a determination is made that the strength of the monitored signal is less than the user-designated threshold value; and
   automatically unlocking the wireless handset when the signal strength is equal to or greater than the user-designated threshold value.

18. A method according to claim 17 wherein said transmitter is incorporated in a device that is wearable on the person of a user or a device capable of being carried on the person of a user.

19. A method according to claim 17 wherein said transmitter is incorporated in a device comprising one of a set of earphones, a writing instrument, eyeglasses and a wristwatch.

20. A method according to claim 17 wherein locking the handset prevents both incoming and outgoing calls.

21. A method according to claim 17 wherein the method further comprises providing a bypass option for bypassing the locking step.

22. A method according to claim 21 wherein the bypass option is executed upon receipt of a valid password.

23. A method according to claim 21 wherein the bypass option is deactivated after a predetermined time period.

* * * * *